July 29, 1941.  F. E. MUNSCHAUER  2,251,153
SHEAR
Filed Dec. 4, 1939  4 Sheets-Sheet 1

INVENTOR
FREDERICK E. MUNSCHAUER,
BY
Bean, Brooks, Buckley & Bean.
ATTORNEYS

July 29, 1941. F. E. MUNSCHAUER 2,251,153
SHEAR
Filed Dec. 4, 1939 4 Sheets-Sheet 3

FIG. 3.

INVENTOR
FREDERICK E. MUNSCHAUER,
BY
Beau, Brooks, Buckley & Beau.
ATTORNEYS

Patented July 29, 1941

2,251,153

UNITED STATES PATENT OFFICE 2,251,153

SHEAR

Frederick E. Munschauer, Buffalo, N. Y., assignor to Niagara Machine and Tool Works, Buffalo, N. Y.

Application December 4, 1939, Serial No. 307,347

25 Claims. (Cl. 164—51)

This invention relates to a shear and particularly to improvements in shears of the relatively heavy and rigid construction required in cutting metal and similar materials.

In the present invention novel arrangement of the structural elements of the machine framework results in a highly advantageous distribution of the loads and stresses to which such machines are generally subjected. Further, a rearrangement of the working instrumentalities of the machine, together with certain novel functional relationships which are provided, result in the production of a shear wherein the work is accomplished in a more efficient manner not only as to mechanical and structural efficiency but also as to economy of production of the machine itself and, what is perhaps of even more importance, economy of operation of the machine, from the standpoint of time, space occupied, and general facility of use.

In one form, my invention comprises the provision of eccentric drive means for work holding means, such eccentric drive being so timed and related with respect to the downward and upward cycle of reciprocation of the shearing means as to approach and hold a work piece more surely and efficiently than devices heretofore provided and with a very much simpler and more accurate mechanical arrangement. In employing the hold-down operating means of the present invention special advantage is derived from the fact that the force of the hold-down means is rendered of greatest effect in the zone of shearing where the greatest hold-down pressure is required.

Construction and assembly of my machine is facilitated and the final accuracy of operation is considerably enhanced by the arrangement of the eccentric drive means and related parts in such manner that eccentric rods having one-piece continuous eccentric embracing portions may be employed throughout. In the preferred form of my invention the necessity of providing separable eccentric rod caps or split bearing construction is entirely dispensed with, although of course such separable construction may be resorted to for reasons other than those of necessity.

In my present invention deflection of the principal drive shaft is minimized by virtue of the novel arrangement of the bearings for the drive shaft and the arrangement of the transmission means on the drive shaft with respect to the bearings. The bending loads on the drive shaft are practically negligible, the forces applied thereto in the transmission of power to the shearing means being much more efficiently absorbed in the form of direct shearing loads and torsional loads on the drive shaft. Among other advantages, troublesome whipping of the drive shaft is eliminated in this manner.

The life of a machine of this class is further greatly extended by pursuing the principles of the present invention in that novel means are afforded for adequately lubricating the moving parts and by protecting such moving parts from interference by outside agencies to the ultimate degree. Other advantages resulting from the pursuance of the teachings of the invention which is exemplified in the drawings and the ensuing description will appear from a perusal of the specification and the drawings herein.

In the drawings, like characters of reference denote like parts and the numerals 10 and 11 designate generally a pair of opposite side frame members or pedestals for the machine. Each of the side frame members or pedestals comprises laterally spaced inner and outer wall portions 13 and 14 respectively and such wall portions are rigidly associated with respect to each other by virtue of preferably integral front and rear walls 15 and 16, respectively.

A bed for the machine is indicated generally at 18 in Figs. 1 and 3 and such bed, for reasons which will hereinafter appear, is of tubular cross section. Such tubular cross section provides upper and lower walls 19 and 20 and front and rear walls 21 and 22. The upper wall 19, in the embodiment illustrated by way of example, serves as a table for receiving sheets of material or other objects to be operated upon by the shear while the remaining walls cooperate therewith to provide a bed of ample structural strength and rigidity and, further, to provide a housing for such portions of the transmission means of the machine as extend transversely between the pedestals 10 and 11.

The ends of the tubular bed element 18 are secured to the opposed inner walls 13 of the pedestals 10 and 11 and for this purpose downwardly directed flanges 23 are provided at the opposite ends of the bed 18. Screws 25 may be passed through suitable openings in the flanges 23 and threaded into the inner walls 13 of the pedestals 10 and 11. The bed 18 is preferably provided with end walls 26 and in the illustrated embodiment intermediate horizontal portions of the pedestals, which will hereinafter be further described, are provided with wells or depressions as at 27 to permit the introduction of screws 28 which are threaded into the end walls 26 of the bed 18 and cooperate with the screws 25 to retain the bed in adjusted position with respect to the pedestals 10 and 11. If desired, a series of intermediate vertical walls may be arranged along the interior of the tubular bed 18, such walls being similar in form to the walls 26 and for the purpose of reinforcing the bed.

Figure 1:
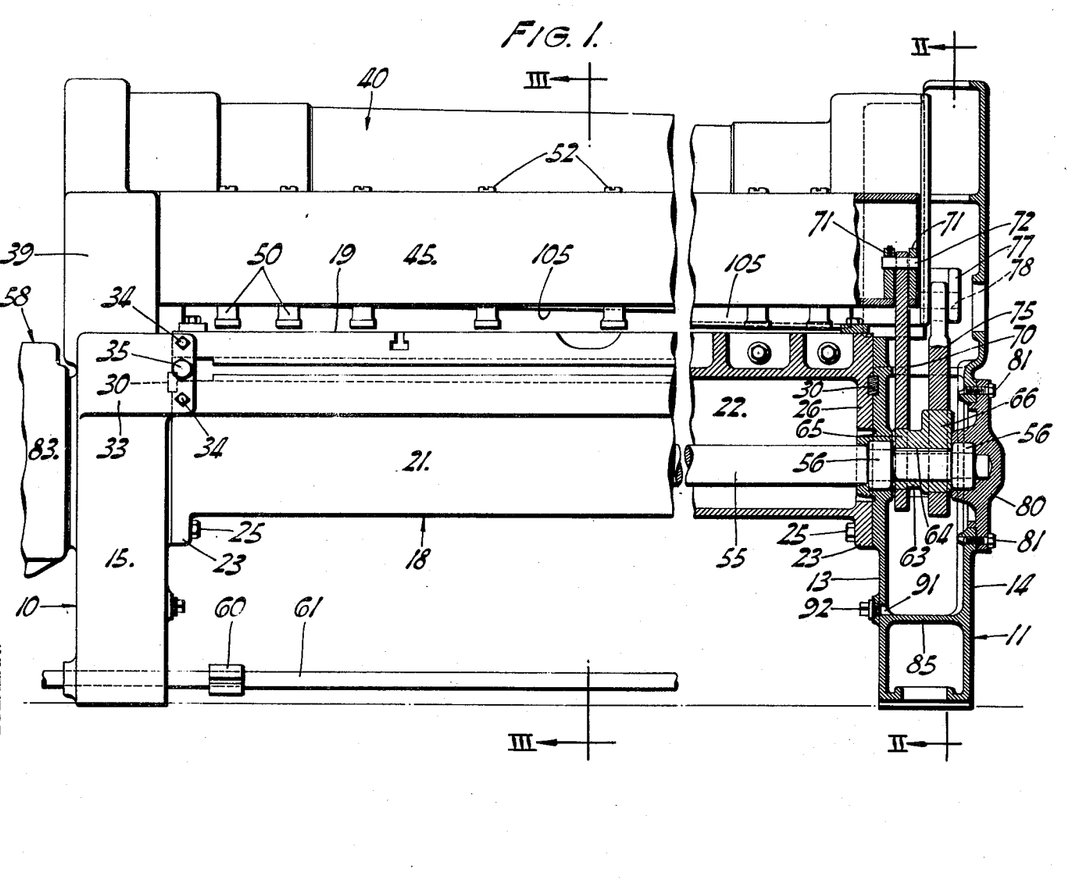
Fig. 1 is an elevational view of one form of the machine of the present invention with portions broken away and other portions shown in cross section, the view being taken from the feeding or front side of the machine.
Figure 2:
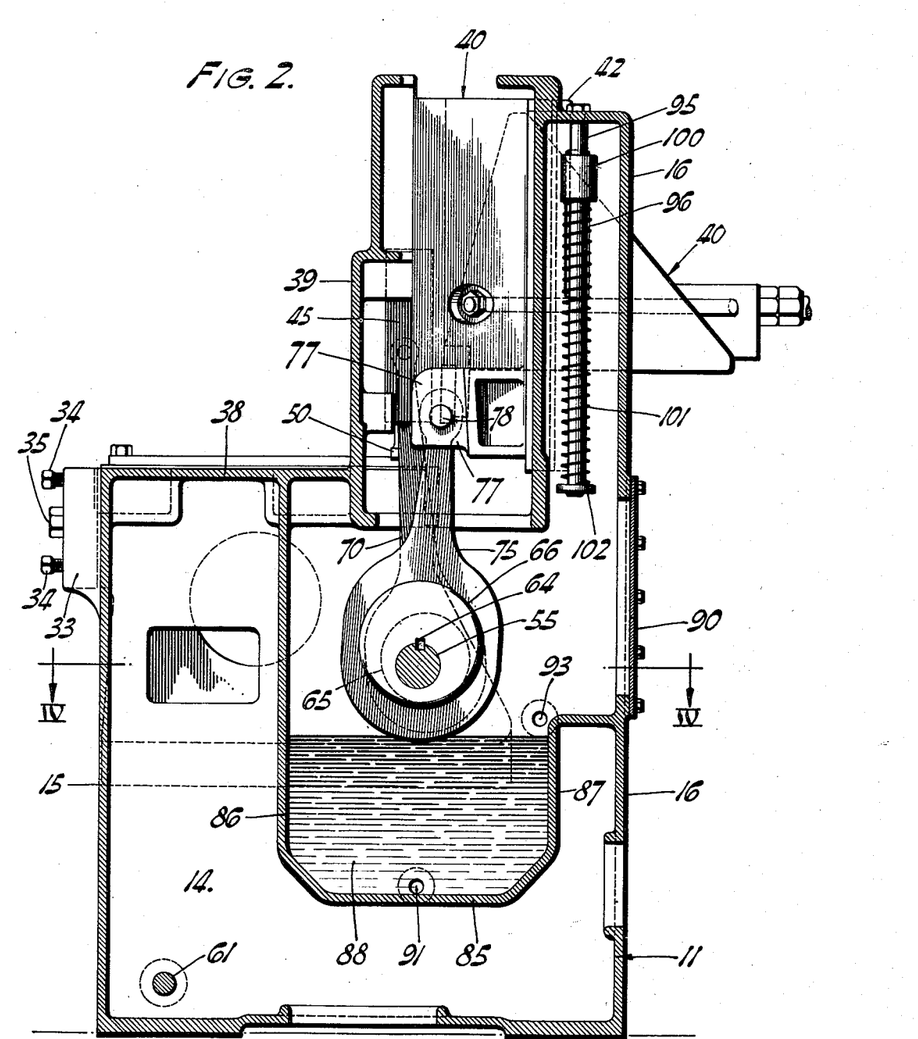
Fig. 2 is a transverse cross sectional view taken on the line II—II of Fig. 1.
Figure 3:
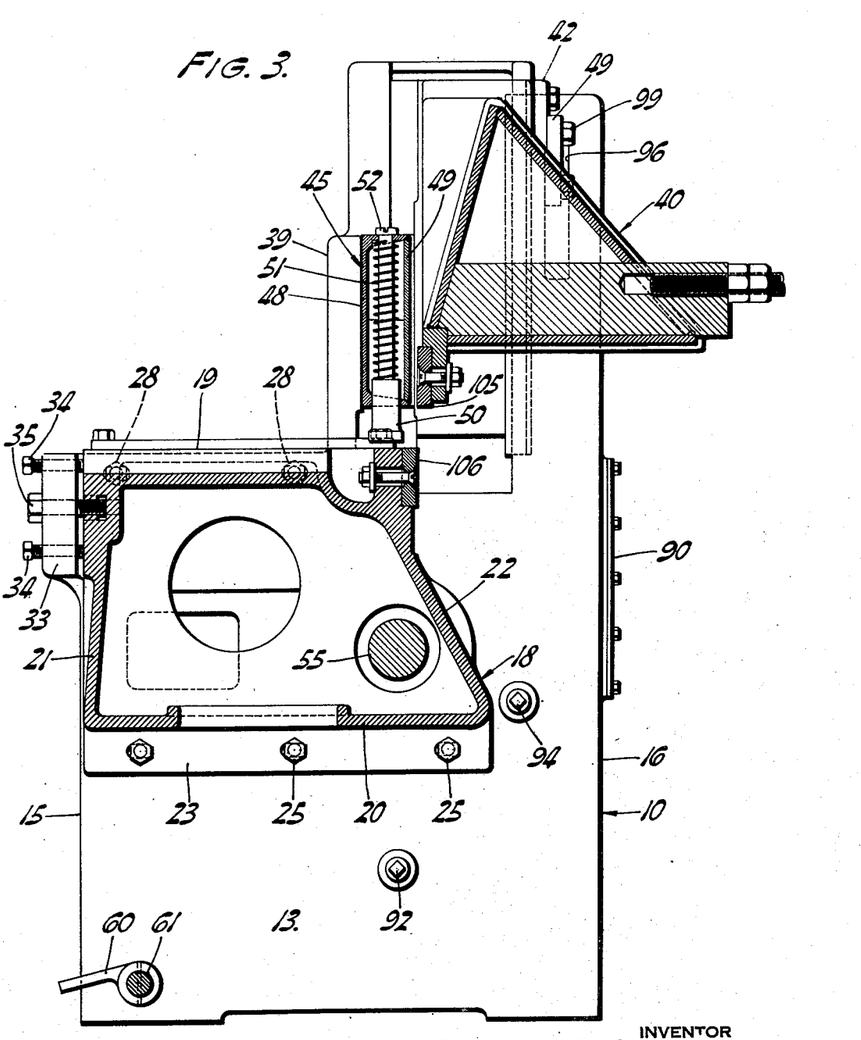
Fig. 3 is a transverse cross sectional view taken on the line III—III of Fig. 1.

It is desirable that the bed 18 be adjustable horizontally with respect to the pedestals 10 and 11 in a direction from left to right as viewed in Figs. 2 and 3 which is back and forth of the machine. To this end a pair of guide keys 30 are utilized and such keys are disposed respectively in complementary grooves formed in the inner walls of the pedestals 10 and 11 and in the end walls of the bed 18 at opposite ends of the machine as is best shown in Fig. 1. The clearance holes through which the screws 25 and 28 pass, formed respectively in the flanges 23 of the bed 18 and the inner walls 13 of the pedestals 10 and 11, are horizontally elongated to permit longitudinal movement of the bed 18 when the screws are loosened.

To permit of accurate adjustment of bed 18 along the guide keys 30, each pedestal 10 and 11 is provided at its upper front corner with a portion 33 which extends inwardly to a position adjacent the front wall 21 of the bed 18. Each such portion 33 has threaded therein a pair of screws 34, the ends of which abut the front wall 21 of the bed 18, and a third screw 35 which passes through an opening in the portion 33 and is threaded into the front wall of the bed 18.

It is believed that the manner of adjustment of the bed 18 will be clear from the foregoing. The screws 25 and 28 are loosened or left in a loose condition and, if it be desired to move the bed 18 from right to left as the machine is viewed in Figs. 2 and 3, the screws 34 are backed off and the screw 35 is screwed into the bed 18 to draw the bed into abutment with the ends of the backed off screws 34. Adjustment of the bed 18 in the opposite direction is accomplished by reversal of this process. After proper adjustment is obtained, the bed is secured in adjusted position by tightening of the several screws 25 and 28.

The rear wall 16 of each pedestal is of substantially greater height than the corresponding front wall 15 thereof and an intermediate horizontal table portion, previously alluded to, is provided adjacent the front of each pedestal as at 38, such table portions forming, in effect, end extensions of the table portion 19 of the bed 18. An intermediate vertical wall portion 39 cooperates with the upper portion of the rear wall 16 and the upper portion of each outside wall 14 to provide, at opposite sides of the machine, guiding and supporting means for a reciprocable crosshead. Such crosshead is designated generally at 40 in Figs. 1 and 3 and may be of the type patented to me in Letters Patent No. 1,992,539 issued February 26, 1935.

Figure 4:
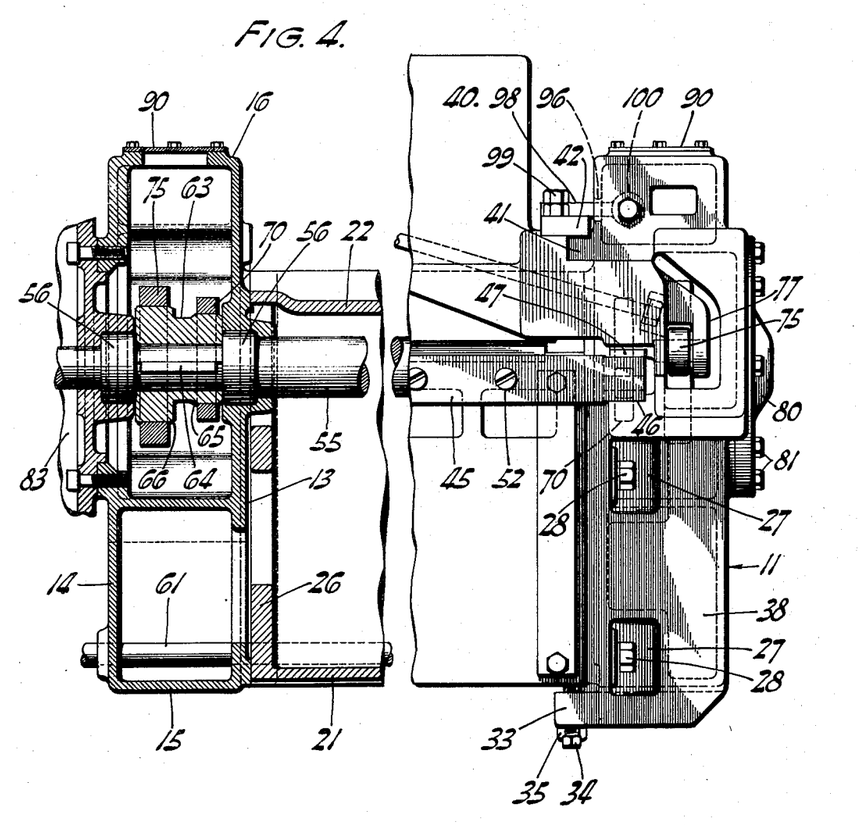
Fig. 4 is a fragmentary top plan view of the machine with portions thereof in cross section, the cross section being taken on the line IV—IV of Fig. 2.

The upper portions of the frame elements 10 and 11 are provided with inwardly directed vertically extending guide portions as at 41 and the crosshead 40 has stepped portions at its opposite ends which cooperate with removable bars 42, see Fig. 4, to form outwardly directed grooves adapted to interfit with the guide portions 41 to position the crosshead 40 for vertical reciprocation.

In addition to the vertically reciprocable crosshead there is provided a vertically reciprocable hold-down means which comprises an element in the nature of a beam 45 extending parallel and adjacent to the crosshead 40. The beam 45 has its ends disposed in grooves or guideways formed in the upper portions of the frame elements 10 and 11 as at 46 and replaceable insert bars 47 are preferably associated with at least one of the walls of such guideways. While other details of construction may be availed of, a convenient method of constructing the beam 45 is by the use of a conventional structural channel, numbered 48, with a plate 49 secured across the outer ends of the flanges thereof as by welding.

Yieldably movable hold-down feet 50 are preferably associated with the beam 45 and may comprise rods having sliding bearing in the upper and lower flanges of the beam 45. The upper portion of each of the rods is preferably of reduced diameter to receive a coil spring 51 and such reduction of diameter provides a ledge for receiving the lower end of the spring, its upper end being engaged against the under side of the upper flange of the beam 45. By this construction each coil spring urges its associated foot 50 downwardly but such downward movement is limited by a head portion 52 which is associated with the upper end of each of the rods.

The transmission and drive means for producing reciprocation of both the crosshead 40 and the hold-down beam 45 and the relationship of the reciprocations of these two elements will now be described. A main drive shaft for the machine is designated 55 and extends completely across the machine, having a pair of spaced journal portions at each of its ends for bearing in both the inner and outer walls of each of the pedestals 10 and 11. Such bearings may include the provision of anti-friction roller or ball bearings as at 56 in Fig. 1. The intermediate portion of the drive shaft 55 is housed and concealed within the tubular bed element 18.

An end of the drive shaft 55 may project beyond one of the pedestals, the pedestal 10 in the present instance, for association with drive and control means indicated at 58 in Fig. 1. The drive means may include a prime mover or means for connection with a rotating shaft and will usually have associated therewith a single revolution clutch of conventional construction. The details of such drive means do not form a part of the present invention and they have therefore not been completely shown or described. A treadle 60 and a treadle shaft 61 are fragmentarily shown in Fig. 1 and any convenient connection between the treadle shaft 61 and the motion controlling means associated with the drive means 58 may be provided.

Within each of the pedestals 10 and 11 and between the inner and outer walls 13 and 14 thereof there is provided an element 63 which is disposed upon and fixed for rotation with the drive shaft 55 as by means of a key 64. Each of the elements 63 is provided with a pair of eccentrics 65 and 66, the eccentric 65 being for reciprocation of the hold-down device and the eccentric 66 being for reciprocation of the crosshead. Each element 63, then, comprises a pair of integrally formed and adjacent eccentrics and the eccentrics are so formed and proportioned that they may conveniently be associated with a pair of eccentric rods or connections without the necessity for the usual provision of separate eccentric straps or caps or split bearings.

A pair of eccentric rods or connections 70 engage the eccentrics 65 and have their opposite ends pivotally connected to the hold-down means and, as shown in Fig. 1, such connection may be effected by provision of a pair of blocks 71 secured rigidly to the beam 45, with the end of the eccentric rod 70 pivotally secured therebetween by a pivot pin 72. Another pair of eccentric rods or connections 75 engage the eccentrics 66 and have their opposite ends pivotally connected to the crosshead and to this end the crosshead 40 is provided at each end and adjacent its lower portion with a bracket arm 77 which is spaced from the crosshead proper a distance sufficient to permit reception of the end of the eccentric rod 75 therebetween, a pivot pin 78 being provided for securing the eccentric rod 75 pivotally to the crosshead 40.

It will be noted that, as viewed in Fig. 2, the eccentric 66 which imparts reciprocating movement to the crosshead is in a top dead center position and the crosshead 40 itself is likewise in its uppermost position of movement. This is the position which the parts of the machine will normally assume at the end of a cycle of operation, the cycle of operation being automatically terminated by the single revolution clutch means heretofore referred to. As viewed in Fig. 2 the drive shaft 55 together with the eccentrics 65 and 66 will rotate in a clockwise direction and it will be noted that the eccentric 65, which controls reciprocation of the hold-down means, is formed and disposed to operate in advance of the eccentric 66 and in the illustrated embodiment the top dead center of the eccentric 65 is approximately 45° in advance of the top dead center of the eccentric 66.

From this it will be seen that when the machine is in a position of rest at the end of a normal working cycle the eccentric 65 will be approximately 45° past its top dead center position and the hold-down means will have begun its downward movement by that much. However, since the downward lineal movement of the hold-down means for this 45° of movement of the eccentric is very much less proportionately than the downward movement which will be imparted to the hold-down means during the succeeding 45° of movement of the eccentric, the result is that the downward movement of the hold-down means at the beginning of a normal working stroke or cycle will be much more abrupt and rapid than if the relative timing of the eccentrics 65 and 66 were otherwise, and in this way the hold-down means reaches and securely holds the work piece before shearing begins.

By virtue of the timed relationship of the crosshead and the hold-down means, as provided by following the teaching set forth herein, higher operating speeds are possible than have heretofore been found feasible. It is to be noted that the prior art practices of employing cams with abrupt rises and complicated linkage and relatively heavy springs for rendering the cams operative are done away with entirely.

During the downward movement of the hold-down means and after the hold-down feet 50 engage the surface of the work piece the springs 51 of the hold-down means are compressed and a constantly increased pressure is exerted in holding the work piece until the bottom dead center position of the eccentric 65 is reached whereupon pressure is decreased until the hold-down feet 50 leave the surface of the work piece. It is found that greatest force in holding the work piece to the surface of the work table is desired during the latter two thirds of shearing operation and a study of the eccentric timing preferably employed herein will show that the greatest hold-down pressure is provided when the eccentrics have moved 135° from the beginning point and this point is very close to the middle of the latter two thirds of the shearing operation; in other words, at a point about two thirds through the actual shearing of a sheet of material.

It will be noted that the eccentric 65 is substantially smaller than the eccentric 66 and that for this reason the eccentric 65 may be passed freely through the opening in the eccentric rod 75 which is provided for reception of the eccentric 66, even though all of the eccentric rods 70 and 75 are solid and continuous in construction, without the usual removable caps or split bearing construction. The manufacturing advantage achieved by the possibility of using eccentric rods entirely in one piece will be obvious to those skilled in the art to which the present invention pertains and a much simpler and more rigid construction results. It is to be noted that, in this preferred form, an integral and unitary connection exists between the drive shaft and both the crosshead and the hold-down means, with no intermediate joints or connecting elements of any kind.

As appears in Fig. 1, the right hand pedestal 11 is provided, in its outer wall 14, with a removable portion 80 which portion supports the outer anti-friction bearing 56. The removable portion 80 may be secured to the wall of the pedestal 11 as by means of screws 81. At the other side of the machine and in association with the pedestal 10 the removable portion 80 of the pedestal 11 is supplanted by a transmission casing 83 which engages over an opening in the outer wall of the pedestal 11 in much the same manner as the removable portion 80. At its left end, as viewed in Fig. 1, the main shaft 55 extends into the transmission casing 83 at which point it may be splined or provided with keyways for engagement with a driving element within the transmission casing. This connection may be in any suitable fashion and the details thereof are not shown but it is desirable that the left end of the shaft be freely withdrawable from the driving member in the transmission casing so that assembly and disassembly of the machine may be readily effected.

In the construction disclosed herein novel means are provided for lubrication of the eccentrics and their associated working parts and to this end each of the pedestals 10 and 11 is provided with an intermediate horizontal partition 85 extending between the sides 13 and 14 of the pedestal and spaced partition portions 86 and 87 leading upwardly from the opposite ends of the partition 85 to the table portion 38 and the rear wall 16 of the pedestal respectively. In this way a lubricant chamber 88 is provided whereby the eccentrics and their associated eccentric rods may run in a lubricant bath.

An opening is provided for giving access to the lubricant chamber and such opening is normally closed by a plate 90 secured thereacross. A drain port 91 is formed adjacent the base of the chamber and a drain plug 92 is associated therewith. If desired a second port 93 may be formed in the wall of the chamber 88 to permit addition of lubricant to the chamber without the necessity of removing the cover plate 90 and a screw plug 94 is provided for normally closing the port 93.

Means are provided for counterbalancing the mass of the crosshead and its associated instrumentalities in their vertical reciprocations and such means show best in Fig. 2 wherein the numeral 95 designates one of a pair of rods which are secured at their upper ends to the pedestals 10 and 11. Each of the rods 95 is disposed substantially vertically within its associated pedestal and preferably spaced from the interior of the walls thereof. The wall of the pedestal is provided with a vertically extending slot as at 96 and through such slot there extends a bracket 98 which has one of its ends secured to the crosshead 40 as by means of the screws 99.

The other end of each bracket 98 terminates in a hub 100 which slidably embraces one of the rods 95. A compression coil spring 101 of suitable proportions is disposed about each of the rods 95 between a washer or collar 102 secured to its lower end and the hub 100 of the bracket 98 so that downward movement of the crosshead 40 causes the spring 101 to be compressed, subsequent upward movement obviously permitting extension of the spring and the release of its stored up energy. In this way the spring retards downward movement of the crosshead and assists upward movement thereof in a degree sufficient to substantially negative the effect of the force of gravity as it tends to modify such movements.

Referring to Fig. 3, it will be noticed that the crosshead 40 is provided with a shear knife 105 which is of conventional construction and secured to the crosshead 40 in a manner not necessary to be described in detail herein. Similarly, a lower shear knife 106 is shown associated with the bed 18 of the machine in such fashion as to cooperate with the upper shear knife 105 in the usual manner for the shearing of sheets or other analogous objects.

While in the form illustrated in the drawings the upper wall 19 of the bed 18 serves directly as a work support, with the lower shear knife 106 secured thereto, it is to be understood that this arrangement is illustrated merely because it is most common and the principles of my invention admit of many modifications in this arrangement. For instance, an intermediate adjustable element, conventionally known as a knife chuck, may be disposed upon the bed 18 and in such case the knife is carried by the knife chuck. Any modifications of the bed and lower shear knife arrangement which appear desirable and which would occur to one skilled in the art may be made without departing from the spirit of the invention as defined in the appended claims.

Any of the known forms of work gauging and locating means common to machines of the class under consideration may be employed without deviation from the present invention, which is concerned with the principles of construction and operation of the shearing machine proper and not particularly with accessories or attachments which might be employed in conjunction therewith. While a single exemplary embodiment has been shown and described for the purpose of complying with statutory requirements, it is to be understood that the principles of the invention are not to be considered as restricted otherwise than as defined in the appended claims.

What is claimed is:

1. In a machine for severing metal sheets and analogous objects, a pair of spaced hollow upright columns, a bed extending therebetween with a work table and a relatively stationary shear knife, a crosshead supported above said bed and between said columns for vertical reciprocation therebetween and having a shear knife adapted to be moved downwardly past said first mentioned shear knife to effect severance of a work piece, a drive shaft extending between said columns below said work table and having at each of its ends spaced journals adapted to have bearing in the opposite side walls of each of the hollow columns, eccentric means within each of said hollow columns and disposed upon said drive shaft between each of said pairs of journal portions, and means connecting said eccentric means with said crosshead for reciprocation thereof, said columns having removable portions in the walls thereof for assembling the eccentric means with the drive shaft in said columns.

2. In a machine for severing metal sheets and analogous objects, a pair of spaced hollow upright columns, a bed extending therebetween with a work table and a relatively stationary shear knife, a crosshead supported above said bed and between said columns for vertical reciprocation therebetween and having a shear knife adapted to be moved downwardly past said first mentioned shear knife to effect severance of a work piece, hold-down means supported between said columns for vertical reciprocation therebetween, said hold-down means being movable downwardly toward said work table to overlie and hold a work piece, a drive shaft extending between said columns below said work table and having at each of its ends spaced journals adapted to have bearing in the opposite side walls of each of the hollow columns, eccentric means within each of said hollow columns and disposed upon said drive shaft between each of said pairs of journal portions, and means connecting said eccentric means with said crosshead and said hold-down means for reciprocation thereof, said columns having removable portions in the walls thereof for assembling the eccentric means with the drive shaft in said columns.

3. In a machine for severing metal sheets and analogous objects, a pair of spaced hollow upright columns, a bed extending therebetween, said bed being of substantially tubular cross section and having its upper surface formed to provide a work table having a relatively stationary shear knife, a crosshead supported above said bed and between said columns for vertical reciprocation therebetween and having a shear knife adapted to be moved downwardly past said first mentioned shear knife to effect severance of a work piece, a drive shaft extending between said columns and within the interior of said bed and having at each of its ends spaced journals adapted to have bearing in the opposite side walls of each of the hollow columns, and means within each of said hollow columns and disposed upon said drive shaft between each of said pairs of journal portions and having connection with said crosshead for reciprocation thereof, said columns having removable portions in the walls thereof for assembling the last mentioned means with said drive shaft in said columns.

4. In a machine for severing metal sheets and analogous objects, a pair of spaced hollow upright columns, a bed extending therebetween, said bed being of substantially tubular cross section and having its upper surface formed to provide a work table having a relatively stationary shear knife, a crosshead supported above said bed and between said columns for vertical reciprocation therebetween and having a shear knife adapted to be moved downwardly past said first mentioned shear knife to effect severance of a work piece, hold-down means supported between said columns for vertical reciprocation therebetween, said hold-down means being movable downwardly toward said work table to overlie and hold a work piece, a drive shaft extending between said columns and within the interior of said bed and having at each of its ends spaced journals adapted to have bearing in the opposite side walls of each of the hollow columns, and means within each of said hollow columns and disposed upon said drive shaft between each of said pairs of journal portions and having connection with said crosshead and said hold-down means for reciprocation thereof, said columns having removable portions in the walls thereof for assembling the last mentioned means with the drive shaft in said columns.

5. In a machine for severing metal sheets and analogous objects, a pair of spaced hollow upright columns, a bed extending therebetween with a work table and a relatively stationary shear knife, a crosshead supported above said bed and between said columns for vertical reciprocation therebetween and having a shear knife adapted to be moved downwardly past said first mentioned shear knife to effect severance of a work piece, a drive shaft extending between said columns below said work table and having at each of its ends spaced journals adapted to have bearing in the opposite side walls of each of the hollow columns, and means within each of said hollow columns and disposed upon said drive shaft between each of said pairs of journal portions and having connection with said crosshead for reciprocation thereof, said columns having removable portions in the walls thereof for assembling the last mentioned means with the drive shaft in said columns.

6. In a machine for severing metal sheets and analogous objects, a pair of spaced hollow upright columns, a bed extending therebetween and a relatively stationary shear knife, a crosshead supported above said bed and between said columns for vertical reciprocation therebetween and having a shear knife adapted to be moved downwardly past said first mentioned shear knife to effect severance of a work piece, hold-down means supported between said columns for vertical reciprocation therebetween, said hold-down means being movable downwardly toward said work piece to overlie and hold the same, a drive shaft extending between said columns and having at each of its ends spaced journal portions adapted to have bearing in the opposite side walls of each of the hollow columns, means within each of said hollow columns and disposed upon said drive shaft between each of said pairs of journal portions and having connection with said crosshead and said hold-down means for reciprocation thereof, and removable portions in the walls of said columns for assembling the last mentioned means with the drive shaft in said columns.

7. In a machine for severing metal sheets and analogous objects, a pair of spaced hollow upright columns, a bed extending therebetween and a relatively stationary shear knife, a crosshead supported above said bed and between said columns for vertical reciprocation therebetween and having a shear knife adapted to be moved downwardly past said first mentioned shear knife to effect severance of a work piece, a drive shaft extending between said columns and having at each of its ends spaced journal portions adapted to have bearing in the opposite side walls of each of the hollow columns, means within each of said hollow columns and disposed upon said drive shaft between each of said pairs of journal portions and having connection with said crosshead for reciprocation thereof, and removable portions in the walls of said columns for assembling the last mentioned means with the drive shaft in said columns.

8. In a machine for severing metal sheets and analogous objects, a pair of spaced hollow upright columns, a bed extending therebetween with a work table and a relatively stationary shear knife, a crosshead supported above said bed and between said columns for vertical reciprocation and having a shear knife adapted to be moved downwardly past said first mentioned shear knife to effect severance of a work piece, a drive shaft extending between said columns below said work table and having at each of its ends spaced journals adapted to have bearing in the opposite side walls of each of the hollow columns, means within each of said hollow columns and disposed upon said drive shaft between each of said pairs of journal portions and having connection with said crosshead for reciprocation thereof, and a wall within each of said columns below said last mentioned means and cooperating with the walls of the column to form a lubricant chamber whereby said means may run in a lubricant bath.

9. In a machine for severing metal sheets and analogous objects, a pair of spaced hollow upright columns, a bed extending therebetween and a relatively stationary shear knife, a crosshead supported above said bed and between said columns for vertical reciprocation and having a shear knife adapted to be moved downwardly past said first mentioned shear knife to effect severance of a work piece, hold-down means supported between said columns for vertical reciprocation, said hold-down means being movable downwardly toward said work piece to overlie and hold the same, a drive shaft having a journal portion adjacent an end thereof and a second journal portion spaced inwardly therefrom, one of said columns having a removable portion in one wall thereof and said first journal portion having bearing in said removable portion, said second journal portion having bearing in the wall of said column opposite said removable portion, a pair of eccentrics disposed upon said shaft between said journal portions and a pair of eccentric rods associated with said eccentrics and engaging the crosshead and the hold-down means for reciprocation thereof.

10. In a machine for severing metal sheets and analogous objects, a pair of spaced hollow upright columns, a bed extending therebetween, a crosshead supported above said bed and between said columns for vertical reciprocation and having a shear knife carried thereby, hold-down means supported between said supports for vertical reciprocation, a drive shaft having a journal portion adjacent an end thereof and a second journal portion spaced inwardly therefrom, one of said columns having a removable portion in a wall thereof and said first journal portion having bearing in said removable portion, said second journal portion having bearing in the wall of said column opposite said removable portion, a pair of eccentrics disposed upon said shaft between said journal portions and a pair of eccentric rods connecting said eccentrics with said crosshead and the hold-down means for reciprocation thereof, the eccentric adjacent said removable wall portion being substantially larger than the other whereby the latter may be assembled on the shaft by introduction through the opening provided by removal of said removable wall portion and through the opening of the rod for the larger eccentric without disassembly of the eccentric rods.

11. In a machine for severing metal sheets and analogous objects, a pair of spaced supports, a bed extending therebetween, a crosshead supported above said bed and between said supports for vertical reciprocation and having a shear knife carried thereby, hold-down means supported between said supports for vertical reciprocation, a drive shaft having a journal portion adjacent an end thereof, one of said supports having a removable portion and said journal portion having bearing in said removable portion, a pair of eccentrics disposed upon said shaft adjacent said removable portion, and a pair of eccentric rods connecting said eccentrics with said crosshead and the hold-down means for reciprocation thereof, the eccentric adjacent said removable portion being substantially larger than the other whereby the latter may be assembled on the shaft by introduction through the opening provided by removal of said removable portion and through the opening of the rod for the larger eccentric without disassembly of the eccentric rods.

12. In a machine for severing metal sheets and analogous objects, a pair of spaced hollow upright columns, a bed extending therebetween with a work table and a relatively stationary shear knife, a crosshead supported above said bed for vertical reciprocation and having a shear knife associated therewith, hold-down means above said bed and comprising a vertically reciprocable member adapted to move downward upon a work piece to hold the same, a drive shaft extending between said columns below said work table and having at each of its ends spaced journals adapted to have bearing in the opposite side walls of each of the hollow columns, a pair of eccentrics within each of said hollow columns and disposed upon said drive shaft between each of said pairs of journal portions, means connecting one of the eccentrics within each column with the crosshead for reciprocation thereof, and means connecting the other of the eccentrics within each column with the hold-down means for reciprocation thereof, said columns having removable wall portions in the walls thereof for assembling the eccentric connecting means and the drive shaft within said columns.

13. In a machine for severing metal sheets and analogous objects, a pair of spaced hollow upright columns, a bed extending therebetween with a work table and a relatively stationary shear knife, a crosshead supported above said bed for vertical reciprocation and having a shear knife associated therewith, hold-down means above said bed and comprising a vertically reciprocable member adapted to move downward upon a work piece to hold the same, a drive shaft extending between said columns below said work table and having at each of its ends spaced journals adapted to have bearing in the opposite side walls of each of the hollow columns, and drive means within each of said hollow columns and disposed upon said drive shaft between each of said pairs of journal portions for connection with said crosshead and said hold-down means for reciprocation thereof, said columns having removable portions in the walls thereof for assembling the drive means with the drive shaft within said columns.

14. In a machine for severing metal sheets and analogous objects, a support and a bed associated therewith, a vertically reciprocable shearing head, hold-down means comprising a vertically reciprocable member adapted to move downward upon a work piece to hold the same, a drive shaft journaled in said support and having a pair of eccentrics disposed thereon, an eccentric rod associated with one of said eccentrics for connection with the shearing head for reciprocation thereof, and an eccentric rod associated with the other of said eccentrics for connection with the hold-down means for reciprocation thereof, said hold-down eccentric being timed to operate in advance of the shearing head eccentric whereby the bottom dead center position of the hold-down eccentric is reached substantially in advance of the bottom dead center position of the shearing head eccentric during the downward movement of the shearing head.

15. In a machine for severing metal sheets and analogous objects, a support and a bed associated therewith, a vertically reciprocable shearing head, hold-down means comprising a vertically reciprocable member adapted to move downward upon a work piece to hold the same, a pair of eccentrics and drive means therefor, an eccentric rod associated with one of said eccentrics for connection with the shearing head for reciprocation thereof, and an eccentric rod associated with the other of said eccentrics for connection with the hold-down means for reciprocation thereof, said hold-down eccentric being timed to operate in advance of the shearing head eccentric by approximately one-eighth of a revolution whereby the bottom dead center position of the hold-down eccentric is reached during the downward movement of the shearing head.

16. In a machine for severing metal sheets and analogous objects, a support and a bed associated therewith, a vertically reciprocable shearing head, hold-down means comprising a vertically reciprocable member adapted to move downward upon a work piece to hold the same, a pair of eccentrics and drive means therefor, an eccentric rod associated with one of said eccentrics for connection with the shearing head for reciprocation thereof, and an eccentric rod associated with the other of said eccentrics for connection with the hold-down means for reciprocation thereof, said hold-down eccentric being timed to operate in advance of the shearing head eccentric whereby the bottom dead center position of the hold-down eccentric is reached during the downward movement of the shearing head.

17. In a machine for severing metal sheets and analogous objects, a support and a bed associated therewith, a vertically reciprocable shearing head, hold-down means comprising a vertically reciprocable member adapted to move downward upon a work piece to hold the same, drive means engageable with said shearing head for moving it downward to effect shearing strokes and for return upward movement, an eccentric and drive means therefor, and an eccentric rod associated with said eccentric for connection with the hold-down means to reciprocate the same, said eccentric being timed for rotation at the same frequency as the reciprocation of the shearing head and so that its bottom dead center position is reached during the downward stroke of the shearing head.

18. In a machine for severing metal sheets and analogous objects, a support and a bed associated therewith, a vertically reciprocable shearing head, hold-down means comprising a vertically reciprocable member and a resiliently yieldable work-engaging element carried thereby, said hold-down means being movable downwardly to dispose said work-engaging element against a work piece to hold the same, drive means engageable with said shearing head for moving it downward to effect shearing strokes and for return upward movement, an eccentric and drive means therefor, and an eccentric rod associated with said eccentric for connection with the hold-down means to reciprocate the same, said eccentric being timed with respect to the shearing head driving means so that lowermost position of the hold-down means and maximum deflection of the yieldable work-engaging element occurs during the downward stroke of the shearing head.

19. In a machine for severing metal sheets and analogous objects, a support and a bed associated therewith, a vertically reciprocable shearing head, hold-down means comprising a vertically reciprocable member and a resiliently yieldable work-engaging element carried thereby, said hold-down means being movable downwardly to dispose said work-engaging element against a work piece to hold the same, drive means engageable with said shearing head for moving it downward to effect shearing strokes and for return upward movement, an eccentric and drive means therefor, and an eccentric rod associated with said eccentric for connection with the hold-down means to reciprocate the same, said eccentric being timed with respect to the shearing head driving means so that lowermost position of the hold-down means and maximum deflection of the yieldable work-engaging element occurs during the latter portion of the downward stroke of the shearing head.

20. In a machine for severing metal sheets and analogous objects, a support and a bed associated therewith, a vertically reciprocable shearing head, hold-down means comprising a vertically reciprocable member and a resiliently yieldable work-engaging element carried thereby, said hold-down means being movable downwardly to dispose said work-engaging element against a work piece to hold the same, drive means engageable with said shearing head for moving it downward to effect shearing strokes and for return upward movement, an eccentric and drive means therefor, and an eccentric rod associated with said eccentric for connection with the hold-down means to reciprocate the same, said eccentric being timed with respect to the shearing head driving means so that lowermost position of the hold-down means and maximum deflection of the yieldable work-engaging element occurs at a point approximately two-thirds through the downward stroke of the shearing head.

21. In a machine for severing metal sheets and analogous objects, a support comprising a hollow upright column, a bed associated therewith, a vertically reciprocable shearing head, hold-down means comprising a vertically reciprocable member adapted to move downwardly upon a work piece to hold the same, a drive shaft journaled in the opposite walls of said column and having a pair of eccentrics disposed thereon between said walls, and eccentric rods associated with said pair of eccentrics for connection with the shearing head and the hold-down means respectively for reciprocation thereof, one of said walls having a removable portion including a bearing for one of said drive shaft journals, the eccentric adjacent said removable portion being substantially larger than the other whereby the latter may be assembled on the shaft by introduction through the opening provided by removal of said removable portion and through the opening of the rod for the larger of the eccentric rods, said eccentric rods each comprising an integral eccentric encircling portion.

22. In a machine for severing metal sheets and analogous objects, a support and a bed associated therewith, a vertically reciprocable shearing head, hold-down means comprising a vertically reciprocable member adapted to move downward upon a work piece to hold the same, drive means engageable with said shearing head for moving it downward to effect shearing strokes and for return upward movement, an eccentric and drive means therefor, an eccentric rod associated with said eccentric for connection with the hold-down means to reciprocate the same, said eccentric being timed to reciprocate the hold-down means ahead of the reciprocation of the shearing head to hold the work piece before shearing is commenced, and yieldable means associated with said hold-down means and adapted to be increasingly and then decreasingly compressed during the downward stroke of the shearing head by virtue of the timing of the eccentric, the work-engaging portion of said hold-down means being in contact with the work piece throughout the shearing cut.

23. In a machine for severing metal sheets and analogous objects, a support and a bed associated therewith, a vertically reciprocable shearing head, hold-down means comprising a vertically reciprocable member and a resiliently yieldable work-engaging element carried thereby, said hold-down means being movable downwardly to dispose said work-engaging element against a work piece to hold the same, drive means engageable with said shearing head for moving it downward to effect shearing strokes and for return upward movement, an eccentric and drive means therefor, and an eccentric rod associated with said eccentric for connection with the hold-down means to reciprocate the same, said eccentric being timed with respect to the shearing head driving means so that lowermost position of the hold-down means and maximum deflection of the yieldable work-engaging element occurs during the downward stroke of the shearing head, whereby said yieldable element imparts a resilient driving force to said shearing head through said drive shaft after said eccentric passes its lower dead center positions to assist in completing the shearing cut.

24. In a machine for severing metal sheets and analogous objects, a pair of spaced hollow upright columns, a bed extending therebetween with a work table and a relatively stationary shear knife, a crosshead supported above said bed and between said columns for vertical reciprocation therebetween and having a shear knife adapted to be moved downwardly past said first mentioned shear knife to effect severance of a work piece, hold-down means supported between said columns for vertical reciprocation therebetween, said hold-down means being movable downwardly toward said work table to overlie and hold a work piece, a drive shaft extending between said columns below said work table and having at each of its ends spaced journals adapted to have bearing in the opposite side walls of each of the hollow columns, eccentric means within each of said hollow columns and disposed upon said drive shaft between each of said pairs of journal portions, and means connecting said eccentric means with said crosshead and said hold-down means for reciprocation thereof, said connecting means being pivotally attached directly to said crosshead and said hold-down means respectively, said columns having removable portions in the walls thereof for assembling the eccentric means with the drive shaft in said columns.

25. In a machine for severing metal sheets and analogous objects, a pair of spaced hollow upright columns, a bed extending therebetween with a work table and a relatively stationary shear knife, a crosshead supported above said bed and between said columns for vertical reciprocation therebetween and having a shear knife adapted to be moved downwardly past said first mentioned shear knife to effect severance of a work piece hold-down means supported between said columns for vertical reciprocation therebetween, said hold-down means being movable downwardly toward said work table to overlie and hold a work piece, a drive shaft extending between said columns below said work table and having at each of its ends spaced journals adapted to have bearing in the opposite side walls of each of the hollow columns, a pair of eccentrics disposed on said drive shaft within each of the hollow columns, an eccentric rod associated with one of said eccentrics within each hollow column and pivotally connected directly to the shearing head for reciprocation thereof, and an eccentric rod associated with the other of said eccentrics within each hollow column and pivotally connected directly to the hold-down means for reciprocation thereof, said hold-down eccentrics being timed to operate in advance of the shearing head eccentrics whereby the bottom dead center position of the hold-down eccentrics is reached substantially in advance of the bottom dead center position of the shearing head eccentrics during downward movement of the shearing head.

FREDERICK E. MUNSCHAUER.